United States Patent
Yamamoto

(10) Patent No.: US 11,135,996 B2
(45) Date of Patent: Oct. 5, 2021

(54) SEATBELT DEVICE

(71) Applicant: Toyota Jidosha Kabushiki Kaisha, Toyota (JP)

(72) Inventor: Kazuhito Yamamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 54 days.

(21) Appl. No.: 16/663,888

(22) Filed: Oct. 25, 2019

(65) Prior Publication Data

US 2020/0130639 A1    Apr. 30, 2020

(30) Foreign Application Priority Data

Oct. 30, 2018 (JP) .............................. JP2018-204415

(51) Int. Cl.
| | |
|---|---|
| *B60R 22/28* | (2006.01) |
| *B60R 22/26* | (2006.01) |
| *B60R 22/46* | (2006.01) |
| *B60R 22/18* | (2006.01) |

(52) U.S. Cl.
CPC .............. *B60R 22/28* (2013.01); *B60R 22/26* (2013.01); *B60R 22/46* (2013.01); *B60R 2022/1806* (2013.01); *B60R 2022/288* (2013.01)

(58) Field of Classification Search
CPC . B60R 22/28; B60R 22/26; B60R 2022/1806; B60R 22/1951; B60R 22/023
See application file for complete search history.

(56) References Cited

U.S. PATENT DOCUMENTS

| | | | |
|---|---|---|---|
| 6,817,629 B2 * | 11/2004 | Herberg | B60R 22/02 280/801.1 |
| 7,011,341 B2 * | 3/2006 | Herberg | B60R 22/02 242/378.4 |

(Continued)

FOREIGN PATENT DOCUMENTS

| | | | |
|---|---|---|---|
| DE | 102006053979 B3 * | 2/2008 | ........... B60R 22/023 |
| DE | 102008026410 A1 * | 12/2009 | ......... B60R 22/1951 |

(Continued)

OTHER PUBLICATIONS

Machine language translation of DE 102006053979B3, obtained from espacenet.com Feb. 4, 2021.*

*Primary Examiner* — Paul N Dickson
*Assistant Examiner* — Mary E Young
(74) *Attorney, Agent, or Firm* — Dinsmore & Shohl LLP

(57) ABSTRACT

A seatbelt device includes a webbing; a tongue; a buckle, in buckled up the webbing, a portion of the webbing configures a lap webbing; a lower restraint member a portion thereof disposed inside a vehicle seat cushion, the lower restraint member, together with the lap webbing, forming a loop opening along a seat front-rear direction, a length direction one side of the lower restraint member being pulled so as to tighten the loop, and the lower restraint member configured to press the body of the occupant from a seat lower side; and a tensioning device actuated in a case of a front-on collision or in a case in which a front-on collision is predicted, the tensioning device pulling the length direction one side of the lower restraint member to tighten the loop, and the tensioning device pulling the lap webbing so as to move toward a seat lower front side.

11 Claims, 8 Drawing Sheets

(56) References Cited

U.S. PATENT DOCUMENTS

| | | | | |
|---|---|---|---|---|
| 7,850,205 | B2* | 12/2010 | Pisaniello | B60R 22/1958 280/801.1 |
| 2004/0070191 | A1* | 4/2004 | Higuchi | B60R 22/02 280/808 |
| 2008/0238178 | A1* | 10/2008 | Guo | B60R 22/1951 297/474 |
| 2010/0084845 | A1* | 4/2010 | Pisaniello | B60R 22/1951 280/801.1 |
| 2014/0265292 | A1* | 9/2014 | Nagasawa, Sr. | B60R 22/26 280/807 |
| 2017/0267207 | A1* | 9/2017 | Pisaniello | B60N 2/68 |
| 2017/0297528 | A1* | 10/2017 | Hermann | A44B 11/2557 |
| 2018/0079341 | A1* | 3/2018 | Nishimura | B60R 22/195 |
| 2019/0202397 | A1* | 7/2019 | Jaradi | B60R 22/1953 |
| 2019/0344746 | A1* | 11/2019 | Moeker | B60R 22/28 |

FOREIGN PATENT DOCUMENTS

| | | | |
|---|---|---|---|
| JP | 2004-130920 | A | 4/2004 |
| JP | 2006-273167 | A | 10/2006 |
| JP | 2010052534 | A * | 3/2010 |
| JP | 2016-190596 | A | 11/2016 |

* cited by examiner

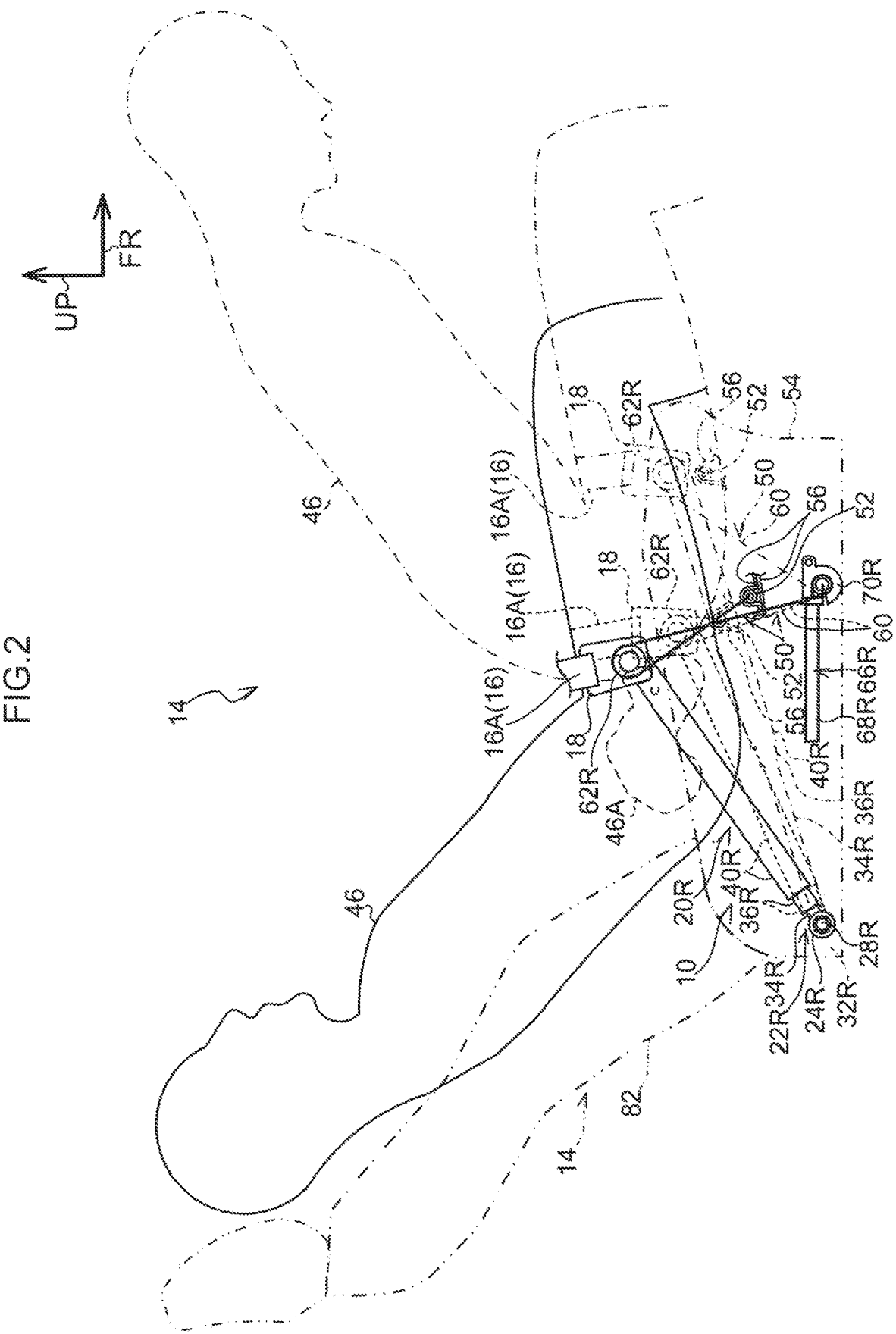

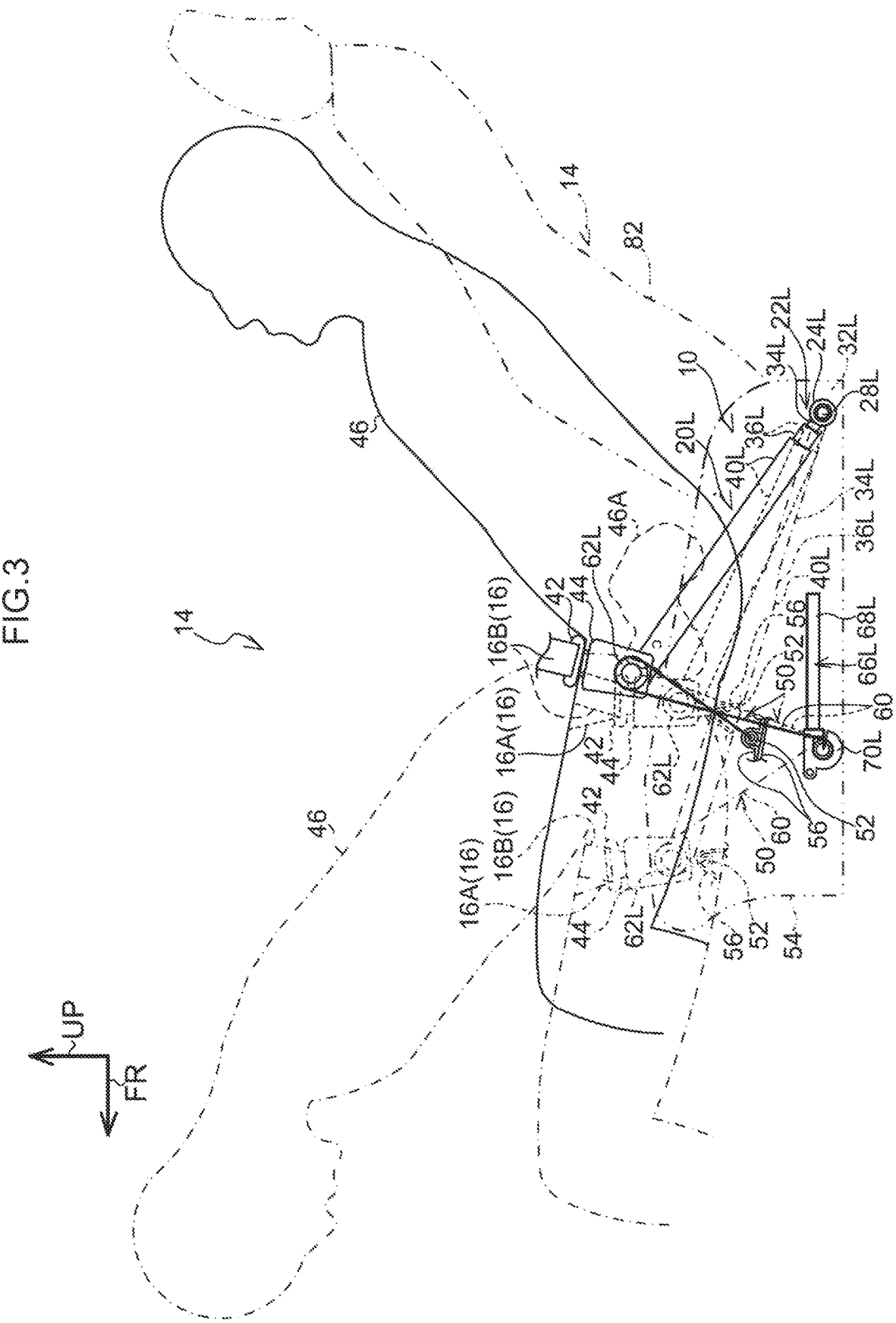

SEATBELT DEVICE

CROSS-REFERENCE TO RELATED APPLICATION

This application claims priority under 35 USC 119 from Japanese Patent Application No. 2018-204415 filed Oct. 30, 2018, the disclosure of which is incorporated by reference herein in its entirety.

BACKGROUND

Technical Field

The present disclosure relates to a seatbelt device capable of holding the body of an occupant seated in a seat of a vehicle using a webbing.

Related Art

Japanese Patent Application Laid-Open (JP-A) No. 2004-130920 discloses a configuration in which a hip belt is provided at a seat lower side of the buttocks or lower limbs of an occupant. In one configuration disclosed in this document, the hip belt is configured as an extension of a lap belt, a leading end side portion of the lap belt being folded back on itself around a tongue to configure the hip belt. In such configuration, by moving the hip belt toward a lap belt side so as to shorten the hip belt in an attempt to increase the restraining force on the body of the occupant from the hip belt, the lap belt becomes longer. This might reduce the restraining force on the body of the occupant by the lap belt.

The above document also discloses a configuration in which the hip belt is separated from the lap belt. In this configuration, when a pre-tensioner actuates, the pelvis of the body of the occupant is pressed from a seat upper side by the lap belt so as to tilt toward a seat rear side.

Accordingly, both of the configurations disclosed in the above document have difficulty suppressing the occurrence of what is referred to as a "submarining phenomenon", in which the body of the occupant moves toward a seat front side between a seat cushion and the lap belt during a vehicle front-on collision.

SUMMARY

In consideration of the above circumstances, the present disclosure obtains a seatbelt device capable of effectively suppressing the occurrence of the submarining phenomenon.

A seatbelt device of a first aspect of the present disclosure includes: a webbing, a tongue, a buckle, a lower restraint member, and a tensioning device. The webbing has an elongated belt shape with a length direction leading end portion of the webbing anchored to a retention member, at least a portion of the webbing configures a lap webbing in a state in which the webbing is worn on a body of an occupant seated in a vehicle seat, and the lap webbing is configured to restrain a location in a vicinity of a waist of the occupant from a seat upper side. The tongue is provided at a length direction intermediate portion of the webbing, and is movable along the webbing in the length direction of the webbing. The buckle is provided at a seat width direction one side of the vehicle seat, and is configured to retain the tongue such that, in a retained state of the tongue, a portion of the webbing that is further toward the length direction leading end side than the tongue configures the lap webbing. The lower restraint member includes a length direction central portion running in the seat width direction inside a seat cushion of the vehicle seat, and, together with the lap webbing, forms a loop opening along a seat front-rear direction. At least a length direction one side of the lower restraint member is pulled and moved so as to tighten the loop and so as to shorten a peripheral length of the loop, and the lower restraint member is configured to press the body of the occupant from a seat lower side. The tensioning device is configured to be actuated in a case of a front-on collision of the vehicle or in a case in which a front-on collision of the vehicle is predicted, the tensioning device is configured to pull at least the length direction one side of the lower restraint member on actuation to tighten the loop, and is configured to pull the lap webbing so as to move the lap webbing toward a seat lower front side.

In the seatbelt device of the first aspect, a portion of the webbing configures the lap webbing in the state in which the webbing is worn on the body of the occupant. The length direction of the lap webbing runs along the seat width direction, and the location in the vicinity of the waist of the body of the occupant is held from the seat upper side by the lap webbing.

The lower restraint member is provided with its length direction along the seat width direction inside the seat cushion. Together with the lap webbing, the lower restraint member forms the loop opening along the seat front-rear direction. Thus, in the state in which the webbing is worn on the body of the occupant seated in the seat, part of the body of the occupant is disposed inside the loop.

The tensioning device is actuated in a front-on collision of the vehicle or in a case in which a front-on collision of the vehicle is predicted. When the tensioning device is actuated, at least the length direction one side of the lower restraint member is pulled and the loop is tightened such that the peripheral length of the loop is shortened. The location in the vicinity of the waist of the body of the occupant is thereby held by being gripped from the seat vertical direction sides by the lap webbing and the lower restraint member.

Furthermore, when the tensioning device is actuated and pulls the lap webbing, the lap webbing moves toward the seat lower front side. Thus, on actuation of the tensioning device, the lap webbing that was worn on the body of the occupant at the seat upper side of the pelvis of the body of the occupant is worn further toward the seat front side than the pelvis, such as at a location between the hips and the thighs of the body of the occupant.

A seatbelt device of a second aspect of the present disclosure is the seatbelt device of the first aspect, further includes a fold-back member that is provided at the seat width direction one side of the vehicle seat. The lower restraint member is led out from inside the seat cushion toward an outside, is extended toward a seat upper side at the seat width direction one side, is connected to the fold-back member, is folded back on itself toward the seat lower side, and is linked to the tensioning device.

In the seatbelt device of the second aspect, the lower restraint member is extended toward the seat upper side at the seat width direction one side of the seat. The lower restraint member that has been extended toward the seat upper side in this manner is folded back on itself toward the seat lower side at the fold-back member and linked to the tensioning device. Thus, when the tensioning device is actuated and pulls the lower restraint member, the portion of the lower restraint member that has been extended from the seat width direction one side toward the fold-back member is moved toward the fold-back member, namely, toward the seat upper side.

A seatbelt device of a third aspect of the present disclosure is the seatbelt device of the second aspect, and the fold-back member is configured by a pulley around which the lower restraint member is entrained, and the pulley is rotated by movement of the lower restraint member toward at least the length direction one side of the lower restraint member.

In the seatbelt device of the third aspect, the fold-back member is configured by the pulley, and the lower restraint member is entrained around the pulley. When the tensioning device is actuated and the lower restraint member moves toward at least the one side in the length direction, the pulley is rotated accompanying the movement of the lower restraint member.

A seatbelt device of a fourth aspect of the present disclosure is the seatbelt device of any one of the first aspect to the third aspect, and the tensioning devices are provided at both sides in the seat width direction of the vehicle seat, and the lower restraint member is pulled toward both sides in the length direction by actuation of the tensioning devices.

In the seatbelt device of the fourth aspect, the tensioning devices are respectively provided at both sides in the seat width direction of the vehicle seat. When the tensioning devices are actuated, the lower restraint member is pulled toward both sides in the length direction. This enables a length direction movement amount of the lower restraint member by actuation of the tensioning devices to be increased, even if a movement amount of the lower restraint member by actuation of each individual tensioning device is small.

A seatbelt device of a fifth aspect of the present disclosure is the seatbelt device of any one of the first aspect to the fourth aspect, further includes a load absorbing member. The load absorbing member is coupled to at least one of the retention member or the buckle, is coupled to an attachment portion disposes at a frame of the seat or at a vehicle body located at further toward a seat lower rear side than the retention member or the buckle. The load absorbing member is configured to permit movement of the retention member or the buckle toward a seat upper front side by undergoing deformation under a load to move the retention member or the buckle toward the seat upper front side, and is configured to absorb some of the load through this deformation.

In the seatbelt device of the fifth aspect, the retention member or the buckle is coupled to the load absorbing member. The load absorbing member is coupled to the attachment portion disposed at the frame of the seat or at the vehicle body located at further toward the seat lower rear side than the retention member or the buckle. Namely, the retention member or the buckle is coupled to the attachment portion through the load absorbing member.

When load to move the retention member or the buckle toward the seat upper front side is transmitted to the load absorbing member and the load absorbing member is deformed by this load, the retention member or the buckle moves toward the seat upper front side accompanying this deformation. Some of the load transmitted to the load absorbing member is expended in the deformation of the load absorbing member and absorbed.

Thus, in cases in which this load is tensile load transmitted to the webbing from the body of the occupant attempting to move toward the seat front side under inertia in a front-on collision, some of the load received by the body of the occupant from the webbing as reaction force to the tensile load can be absorbed by deformation of the load absorbing member, enabling the body of the occupant to move toward the seat front side by a stroke commensurate to the deformation amount of the load absorbing member.

A seatbelt device of a sixth aspect of the present disclosure is the seatbelt device of the fifth aspect, and the load absorbing member has a cylinder shape, includes a rod-shaped member disposed inside the load absorbing member, and is provided with a load imparting portion at one end side coupled to the retention member or the buckle. The one end side is open, and the opening has a shape smaller than the load imparting portion. One length direction end portion of the rod-shaped member is coupled to the attachment portion. The load imparting portion is larger than the rod-shaped member in a direction orthogonal to the length direction of the rod-shaped member, and is provided at another length direction end portion of the rod-shaped member. The load absorbing member is configured to be moved toward the seat upper front side by a load to move the retention member or the buckle toward the seat upper front side.

In the seatbelt device of the sixth aspect, the one length direction end portion of the rod-shaped member is coupled to the attachment portion disposed at the frame of the seat or at the vehicle body, and the rod-shaped member is disposed inside the cylinder shaped load absorbing member. The load imparting portion is disposed at the other length direction end portion of the rod-shaped member. When the retention member or the buckle receives load and moves toward the seat upper front side, the load absorbing member moves toward the seat upper front side.

The load imparting portion is larger than the shape of the opening of the load absorbing member. Thus, when the load absorbing member moves accompanying the retention member or the buckle, the load absorbing member is deformed by the load imparting portion. Some of the load from the retention member or the buckle moving toward the seat upper front side is absorbed by this deformation of the load absorbing member.

A seatbelt device of a seventh aspect of the present disclosure is the seatbelt device of any one of the first aspect to the sixth aspect, and the tongue is capable of restricting movement of the webbing further toward the length direction leading end side of the webbing than the tongue.

In the seatbelt device of the seventh aspect, the tongue is capable of restricting movement of the webbing further toward the length direction leading end side of the webbing than the tongue. Thus, when the body of the occupant attempts to move toward the seat front side under inertia in a front-on collision and the lap webbing is pulled by the body of the occupant, movement of a shoulder webbing toward a lap webbing side is restricted by the tongue, thereby enabling lengthening of the lap webbing to be suppressed.

As explained above, in the seatbelt device of the first aspect, the location in the vicinity of the waist of the body of the occupant is held by being gripped between the lap webbing and the lower restraint member from the seat vertical direction both sides, without the lap webbing configuring the loop becoming longer. Moreover, on actuation of the tensioning device, the lap webbing moves to the location between the hips and the thighs of the body of the occupant that is further toward the seat front side than the pelvis, such that the pelvis of the occupant is suppressed from being pressed by the lap webbing so as to tilt toward the seat rear side. This enables the occurrence of what is referred to as the "submarining phenomenon", in which the body of the occupant moves toward the seat front side between the lap webbing and the seat cushion, to be suppressed.

In the seatbelt device of the second aspect, when the tensioning device is actuated, the portion of the lower restraint member that has been extended from the seat width direction one side toward the fold-back member is raised toward the fold-back member. This enables the portion of the lower restraint member disposed inside the seat cushion to be raised toward the seat upper side, enabling the body of the occupant to be held by being gripped between the lower restraint member and the lap webbing from the seat vertical direction both sides.

In the seatbelt device of the third aspect, when the tensioning device is actuated and the lower restraint member is moved toward the at least length direction one side, the pulley, serving as the fold-back member, is rotated accompanying the movement of the lower restraint member, thereby the lower restraint member to be moved smoothly.

In the seatbelt device of the fourth aspect, the movement amount of the lower restraint member toward both sides in the length direction can be increased by actuation of the tensioning devices. This enables the movement amount of the lower restraint member by actuation of each individual tensioning device to be reduced, enabling a reduction in the size of the tensioning devices.

In the seatbelt device of the fifth aspect, the load absorbing member that, by deforming, lessens the load transmitted to the body of the occupant from the webbing in a front-on collision of the vehicle functions as a part to couple the retention member or the buckle to the attachment portion disposed at the frame of the seat or at the vehicle body, enabling an increase in the number of components to be suppressed.

In the seatbelt device of the sixth aspect, the load absorbing member is configured in a cylinder shape inside which the rod-shaped member enters. This enables the rod-shaped member and the load absorbing member to be made compact in the seat width direction, which may be exploited during installation in a narrow space at a side in the seat width direction of the seat.

In the seatbelt device of the seventh aspect, the shoulder webbing can be suppressed from moving toward the lap webbing side such that the lap webbing is not lengthened when the lap webbing is pulled by the body of the occupant, thereby enabling the body of the occupant attempting to move toward the seat front side under inertia in a front-on collision to be effectively held by the lap webbing.

BRIEF DESCRIPTION OF THE DRAWINGS

Exemplary embodiments of the present disclosure will be described in detail based on the following figures, wherein:

FIG. 2 is a side view of a seat applied with a seatbelt device according to an exemplary embodiment of the present disclosure, as viewed from a seat right side, in which the solid lines illustrate a state in which a webbing is worn on the body of an occupant, the dotted lines illustrate a state in which a right pre-tensioner has actuated, and the single-dotted dashed lines illustrate a state in which the body of the occupant has moved toward the seat front side under inertia;

FIG. 3 is a side view of a seat applied with a seatbelt device according to an exemplary embodiment of the present disclosure, as viewed from a seat left side, in which the solid lines illustrate a state in which a webbing is worn on the body of an occupant, the dotted lines illustrate a state in which a left pre-tensioner has actuated, and the single-dotted dashed lines illustrate a state in which the body of the occupant has moved toward the seat front side under inertia;

DETAILED DESCRIPTION

Explanation follows regarding an exemplary embodiment of the present disclosure, with reference to FIG. 1 to FIG. 5. In each of the drawings, the arrow FR indicates a front side (seat front side) of a seat 14 applied with a seatbelt device 10 according to the present exemplary embodiment. The arrow RH indicates a sear right side (seat width direction right side), and the arrow UP indicates a seat upper side. In the present exemplary embodiment, an example is described in which the seat 14 is disposed on the right side of the vehicle width direction center of a vehicle. Accordingly, when viewed in the context of the vehicle, the seat right side corresponds to a vehicle width direction outer side, and the seat left side corresponds to a vehicle width direction inner side. Were the seat 14 to be disposed on the left side of the vehicle width direction center of the vehicle, the vehicle width direction outer side and inner side would be reversed from the above.

Configuration of Present Exemplary Embodiment

Figure 1:
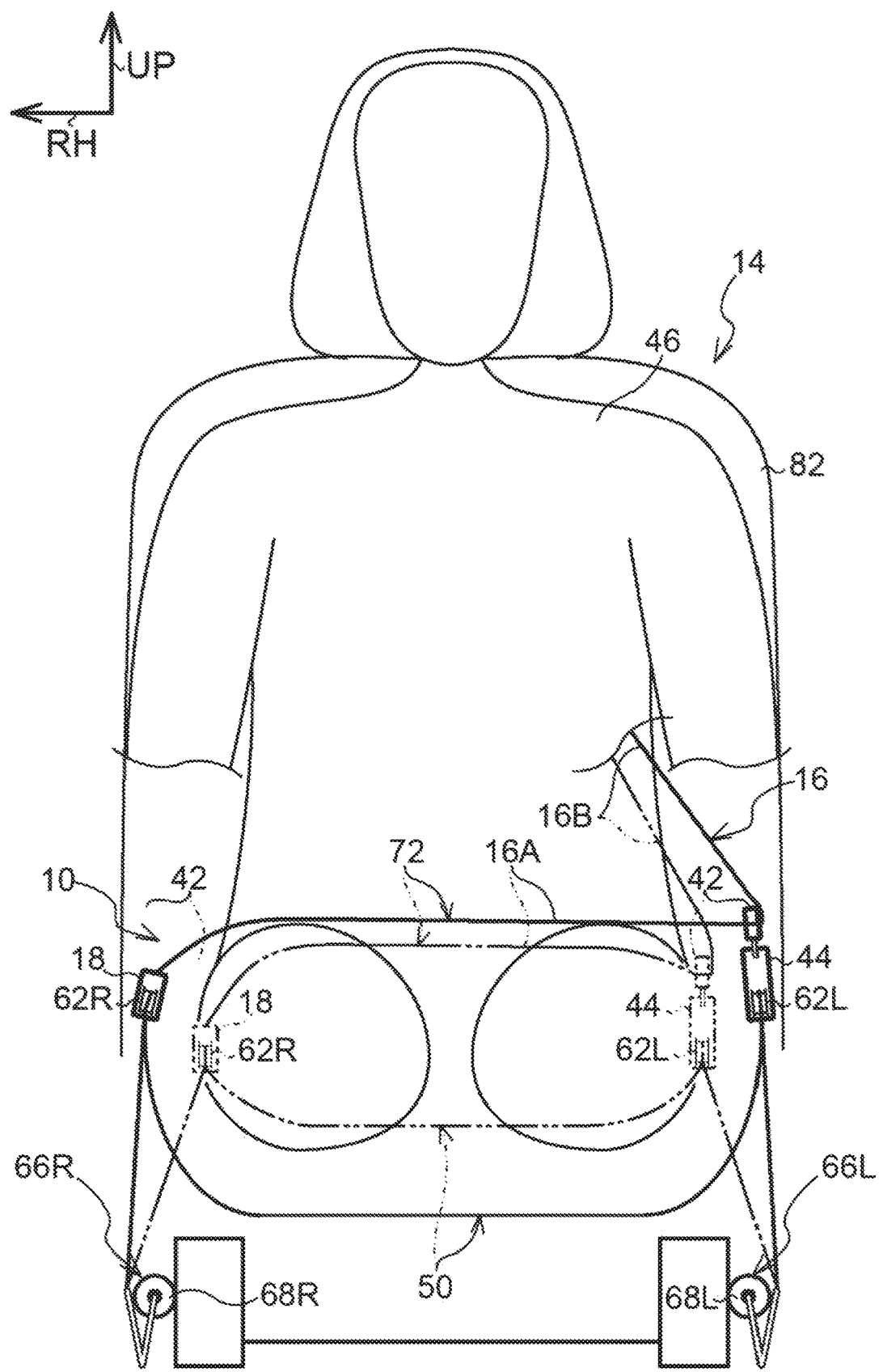
FIG. 1 is a face-on view of a seat applied with a seatbelt device according to an exemplary embodiment of the present disclosure.

As illustrated in FIG. 1 to FIG. 3, the seatbelt device 10 according to the present exemplary embodiment includes a webbing 16. The webbing 16 is flexible, and is configured in an elongated belt shape. A length direction base end portion of the webbing 16 is anchored to a spool of a retractor (neither of these are illustrated in the drawings), and a length direction base end side of the webbing 16 is taken up onto an outer peripheral portion of the spool. The retractor further includes a shoulder pre-tensioner (not illustrated in the drawings). The shoulder pre-tensioner is actuated when the vehicle collides with an obstacle in front or the like (in the event of a vehicle front-on collision). On actuation of the shoulder pre-tensioner, the spool is forcibly rotated in a take-up direction to take up the webbing 16. The webbing 16 is thus taken up onto the spool of the retractor.

The retractor is, for example, disposed in the vicinity of a vehicle lower side end portion of a center pillar (not illustrated in the drawings) of the vehicle, and the webbing 16 is pulled out from the spool toward the vehicle upper side so as to run along the center pillar. A through anchor (not illustrated in the drawings) is provided in the vicinity of a vehicle upper side end portion of the center pillar, and the webbing 16 is passed through a slit formed in the through anchor and folded back on itself toward the vehicle lower side. As illustrated in FIG. 2, a length direction leading end portion of the webbing 16 is fixed to a retention member 18 provided at the right side of the seat 14.

Figure 4A:
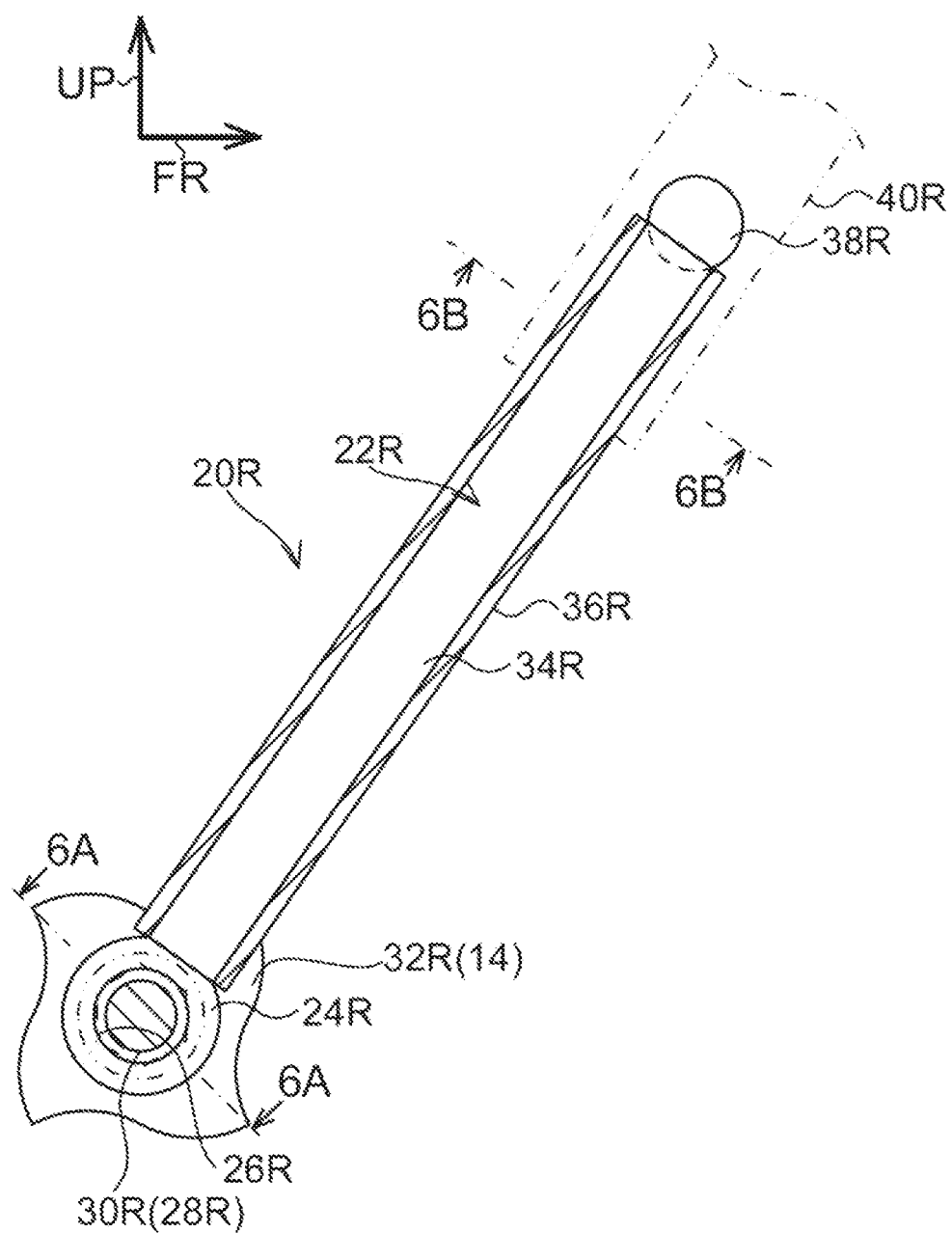
FIG. 4A is an enlarged side view illustrating a cross-section of part of a right force limiter as viewed from a seat right side in a state prior to actuation of the right force limiter.
Figure 6A:
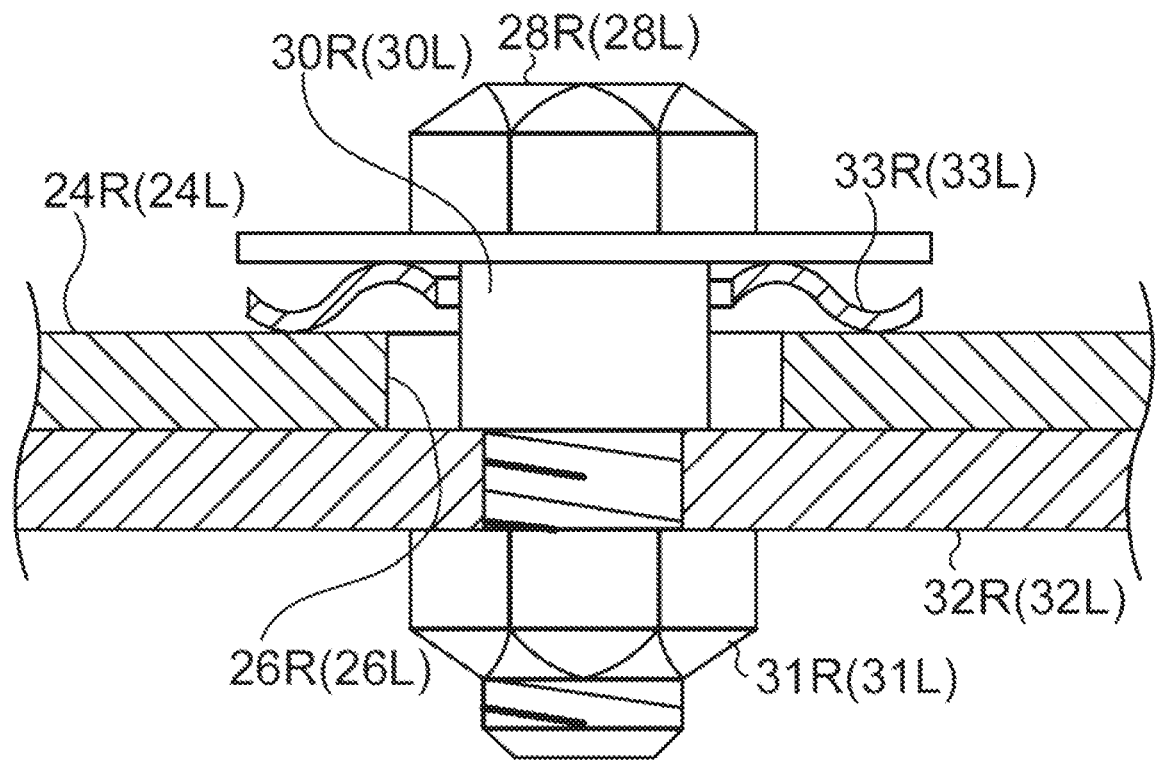
FIG. 6A is a cross-section sectioned along lines 6A-6A in FIG. 4A and FIG. 5A, in which the reference numerals in brackets represent configuration of the left force limiter.

As illustrated in FIG. 2, a right force limiter 20R, serving as a load absorbing device, is provided at a right side of the seat 14. The right force limiter 20R includes an anchor rod 22R, serving as a rod-shaped member. As illustrated in FIG. 4A, the anchor rod 22R includes an anchor portion 24R. A hole 26R is formed penetrating the anchor portion 24R in the seat width direction. As illustrated in FIG. 6A, a shoulder 30R of a shoulder bolt 28R is disposed so as to penetrate the hole 26R. An axial direction leading end side of the shoulder bolt 28R passing through the hole 26R penetrates a right attachment portion 32R set at a rear-right side end portion of a seat frame configuring the seat 14, and is fastened by a nut 31R from the opposite side of the right attachment portion 32R to the anchor portion 24R.

By coupling the anchor portion 24R to the right attachment portion 32R in this manner, the anchor rod 22R is capable of pivoting in directions about an axis with an axial direction running in the seat width direction, centered on the vicinity of the center of the hole 26R. Moreover, an external diameter dimension of the shoulder 30R of the shoulder bolt 28R is smaller than an internal diameter dimension of the hole 26R, and an axial direction dimension of the shoulder 30R is longer than a seat width direction dimension of the anchor portion 24R at the hole 26R. A wave washer 33R is interposed between the head of the shoulder bolt 28R and the anchor portion 24R, such the anchor portion 24R, and therefore the right force limiter 20R, is capable of moving toward the opposite side to the right attachment portion 32R in the seat width direction by elastic deformation of the wave washer 33R. The anchor rod 22R is thus capable of swinging in the seat width direction substantially centered on the hole 26R. Note that although the wave washer 33R is employed in the present exemplary embodiment, a cone washer may be employed as an alternative to the wave washer 33R.

As illustrated in FIG. 4A, the anchor rod 22R further includes a rod portion 34R. The rod portion 34R is, for example, configured in a rod shape with a circular cross-section profile as sectioned in a direction orthogonal to its length direction. A seat lower side end of the rod portion 34R is integrally linked to the anchor portion 24R.

The right force limiter 20R further includes a load absorbing member 36R. The load absorbing member 36R has a circular cylinder shape open along its length direction, and the rod portion 34R is inserted into the load absorbing member 36R from a seat lower side end of the load absorbing member 36R. A seat upper side end portion of the rod portion 34R projects from a seat upper side end of the load absorbing member 36R. A ball portion 38R, serving as a load imparting portion, is formed at a seat upper side end of the rod portion 34R.

An external diameter dimension of the ball portion 38R is larger than an internal diameter dimension of the load absorbing member 36R. The seat upper side end of the load absorbing member 36R accordingly abuts an outer peripheral portion of the ball portion 38R, such that the load absorbing member 36R is restricted from moving toward the seat upper end side of the rod portion 34R. Note that when the load absorbing member 36R attempts to move toward the seat upper end side of the rod portion 34R and the seat upper side end of the load absorbing member 36R abuts the outer peripheral portion of the ball portion 38R, the load absorbing member 36R receives a reaction force from the ball portion 38R. When an inner peripheral portion of the load absorbing member 36R is deformed and enlarged as a result of this reaction force, the load absorbing member 36R is able to move further toward the seat upper end side of the rod portion 34R.

Figure 6B:
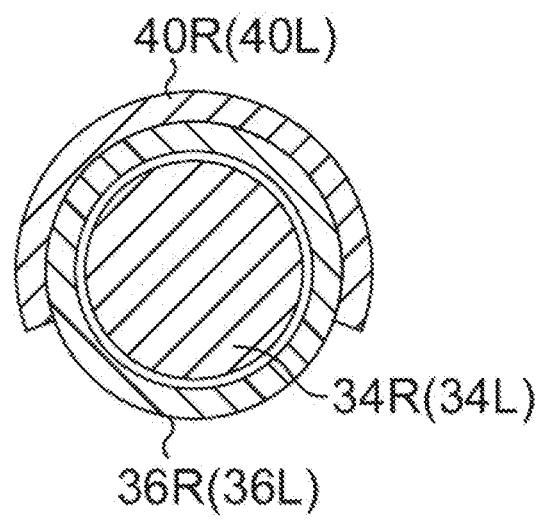
FIG. 6B is a cross-section sectioned along lines 6B-6B in FIG. 4A and FIG. 5A, in which the reference numerals in brackets represent configuration of the left force limiter.

As illustrated in FIG. 6B, the load absorbing member 36R is provided with a stay 40R. The stay 40R is plate shaped, and a portion of the stay 40R that opposes the load absorbing member 36R in a radial direction of the load absorbing member 36R is curled so as to wrap around an outer peripheral portion of the load absorbing member 36R, and is fixed to the load absorbing member 36R by welding or the like. The retention member 18 described above is also coupled to the stay 40R. Namely, the length direction leading end portion of the webbing 16 is coupled to the right attachment portion 32R through the retention member 18, the stay 40R, the load absorbing member 36R, and the anchor rod 22R. Accordingly, for example, a tensile load pulling the webbing 16 toward its length direction base end side is transmitted from the retention member 18 to the right attachment portion 32R.

As illustrated in FIG. 1 and FIG. 3, a tongue 42 is provided at a portion of the webbing 16 between the retention member 18 and the through anchor described above. The tongue 42 is formed with a slit, and the webbing 16 is passed through the slit in the tongue 42. The webbing 16 is thus capable of moving relative to the tongue 42 along the length direction of the webbing 16. The tongue 42 has what is referred to as a "locking tongue" configuration. Namely, the tongue 42 includes a known locking member (not illustrated in the drawings). For example, the locking member is provided at the tongue 42 so as to be capable of moving toward and away from an opposing portion of the tongue 42 that opposes the locking member across the webbing 16. When the locking member approaches the opposing portion of the tongue 42, the webbing 16 is pinched between the locking member and the opposing portion of the tongue 42, such that the webbing 16 is restricted from moving from its length direction base end side toward its length direction leading end side relative to the tongue 42.

A buckle 44 corresponding to the tongue 42 is provided on the left side of the seat 14. The tongue 42 is inserted into the buckle 44 so as to be retained by the buckle 44. When the tongue 42 is retained by the buckle 44 in a state in which the webbing 16 has been entrained over the body of an occupant 46 seated in the seat 14, a worn state of the webbing 16 over the body of the occupant 46 is attained (this state is referred to hereafter as a "webbing worn state").

In the webbing worn state, the webbing 16 between the retention member 18 and the tongue 42 configures a lap webbing 16A. The lap webbing 16A holds the vicinity of the waist of the body of the occupant 46 (for example, near to the pelvis 46A of the occupant 46) from the seat upper front side. Moreover, in the webbing worn state, the webbing 16 between the tongue 42 and the through anchor previously described configures a shoulder webbing 16B. The shoulder webbing 16B holds a location of the occupant 46 running from the right shoulder, across the chest, and to a seat left side part of the waist from the seat front side.

A left force limiter 20L, serving as a load absorbing device, is provided at the left side of the seat 14. The left force limiter 20L has the same basic configuration as that of the right force limiter 20R described above. Accordingly, in FIG. 1, FIG. 3, FIG. 5, and FIG. 6, reference numerals for configurations equivalent to those of the right force limiter 20R are suffixed with "L" instead of "R", and detailed explanation regarding the configuration of the left force limiter 20L is omitted (in FIG. 6, the reference numerals in parentheses correspond to the configuration of the left force limiter 20L).

Note that the anchor portion 24L of the anchor rod 22L, serving as a rod-shaped member of the left force limiter 20L, is coupled to a left attachment portion 32L set at a seat left rear side end portion of the seat frame configuring the seat 14. The configuration of the stay 40L of the left force limiter 20L differs from that of the stay 40R of the right force limiter 20R such that the buckle 44, instead of the retention member 18, is coupled to the stay 40L of the left force limiter 20L.

By coupling the buckle 44 to the stay 40L in this manner, the buckle 44 is coupled to the left attachment portion 32L set on the seat frame through the load absorbing member 36L and the anchor rod 22L. Accordingly, for example, tensile load pulling the webbing 16 toward its length direction leading end side is thus transmitted to the left attachment portion 32L through the buckle 44.

As illustrated in FIG. 1 to FIG. 3, the seatbelt device 10 includes a lower restraint member 50. The lower restraint member 50 includes a cylindrical member 52. The cylindrical member 52 is flexible, and is formed in a circular cylinder shape open along its length direction. The cylindrical member 52 is provided inside a seat cushion 54, and is, for example, disposed substantially at a seat lower side of the lap webbing 16A in the webbing worn state.

In the present exemplary embodiment, the seat cushion 54 includes cushion materials that are separated in the seat vertical direction. A pair of sheet members 56 are provided between the upper cushion material and the lower cushion material. The pair of sheet members 56 are flexible, and are each configured in a thin sheet shape using felt, fabric, or the like. The sheet members 56 are substantially superimposed on each other in the seat vertical direction, and the cylindrical member 52 is disposed between an upper side sheet member 56 and a lower side sheet member 56. The two length direction ends of the cylindrical member 52 are disposed further toward a seat lower side than the retention member 18 and the buckle 44 at the both side ends in the seat width direction of the seat 14. A length direction central portion of the cylindrical member 52 flexes further toward the seat lower side than the two length direction end side portions of the cylindrical member 52.

An elongated member 60 passes through the inside of the cylindrical member 52. The elongated member 60 is configured in a flexible elongated thread or belt shape. As illustrated in FIG. 2, the elongated member 60 is disposed running in the seat width direction, and one side in a length direction of the elongated member 60 extends from a seat right side end portion of the cylindrical member 52 toward the outer side of the cylindrical member 52, and then extends toward the outer side of the seat 14. A right pulley 62R, serving as a fold-back member, is provided at the retention member 18 so as to correspond to the one side in the length direction of the elongated member 60. The right pulley 62R is supported by the retention member 18 so as to be rotatable in a direction about an axis with an axial direction running substantially along the seat width direction. The one side of the elongated member 60 is entrained around the right pulley 62R from the seat lower side and folded back on itself toward the seat lower side.

A right pre-tensioner 66R, serving as a tensioning device, is provided at a lower side and toward a seat front right side of the seat cushion 54. The right pre-tensioner 66R includes a cylinder 68R. The length direction of the cylinder 68R runs substantially in a seat front-rear direction. A guide portion 70R is provided at a seat front side of the cylinder 68R. The guide portion 70R is curved about an axis with an axial direction running in the seat width direction, with the center of curvature being at a predetermined position further toward the seat lower front side than the cylinder 68R. The portion of the elongated member 60 that has been extended toward the outer side of the cylindrical member 52 and entrained around the right pulley 62R is extended from the right pulley 62R toward the seat lower front side and entrained around the guide portion 70R.

A portion of the elongated member 60 further toward a length direction one side than the guide portion 70R extends from the guide portion 70R toward the seat rear side, and enters inside the cylinder 68R through the seat front side of the cylinder 68R. A piston (not illustrated in the drawings) is housed inside the cylinder 68R, and a length direction one end portion of the elongated member 60 is anchored to the piston. The cylinder 68R is further provided with a gas supply device (not illustrated in the drawings) such as a micro gas generator.

The gas supply device is actuated in the event of a vehicle front-on collision. On actuation of the gas supply device, gas is supplied into the cylinder 68R, and the pressure of this gas moves the piston toward the seat rear side inside the cylinder 68R. This movement of the piston toward the seat rear side moves the length direction one end portion of the elongated member 60 toward the seat rear side, such that the elongated member 60 is pulled toward the length direction one side.

As illustrated in FIG. 3, a length direction other side of the elongated member 60 extends from a seat left side end portion of the cylindrical member 52 toward the outer side of the cylindrical member 52, and then extends toward the outer side of the seat 14. A left pulley 62L, serving as a fold-back member, is provided at the buckle 44 so as to correspond to the length direction other side of the elongated member 60. The left pulley 62L is supported by the buckle 44 so as to be rotatable in a direction about an axis with an axial direction running substantially in the seat width direction. The other side of the elongated member 60 is entrained around the left pulley 62L from the seat lower side and folded back on itself toward the seat lower side.

A left pre-tensioner 66L, serving as a tensioning device, is provided at a lower side and toward a seat front left side of the seat cushion 54. The left pre-tensioner 66L has the same basic configuration as the right pre-tensioner 66R described above. Accordingly, in FIG. 1, FIG. 3, and the like, reference numerals for configurations equivalent to those of the right pre-tensioner 66R are suffixed with "L" instead of "R", and detailed explanation regarding the configuration of the left pre-tensioner 66L is omitted.

A portion of the elongated member 60 extending toward the outer side of the cylindrical member 52, entrained around the left pulley 62L, and extended toward the seat lower side is entrained around the guide portion 70L of the left pre-tensioner 66L. A length direction other end portion of the elongated member 60 is anchored to the piston inside the cylinder 68L of the left pre-tensioner 66L. Accordingly, when the piston inside the cylinder 68L moves toward the seat rear side, the length direction other end portion of the elongated member 60 is moved toward the seat rear side, such that the elongated member 60 is pulled toward the length direction other side.

In this manner, the elongated member 60 is entrained around the right pulley 62R further toward the seat right side than the cylindrical member 52, and the elongated member 60 is entrained around the left pulley 62L further to the seat left side than the cylindrical member 52. Accordingly, the semblance of a loop 72 that is open in substantially the seat front-rear direction is formed by the portion of the elongated member 60 between the right pulley 62R and the left pulley 62L and by the lap webbing 16A of the webbing 16.

Operation and Advantageous Effects of Present Exemplary Embodiment

In the present exemplary embodiment configured as described above, when in the webbing worn state, the vicinity of the waist of the occupant 46 is held from the seat upper front side by the lap webbing 16A. In this state, the vicinity of the waist of the occupant 46 passes through (is disposed penetrating) the inside of the semblance loop 72 configured by the portion of the elongated member 60 of the lower restraint member 50 between the right pulley 62R and the left pulley 62L, and by the lap webbing 16A.

In this state, in the event of a vehicle front-on collision, the shoulder pre-tensioner of the retractor is actuated, such that the spool is forcibly rotated in the take-up direction. The webbing 16 is taken up onto the spool by the take-up direction rotation of the spool. When the webbing 16 is taken up onto the spool, the length of the webbing 16 between the length direction leading end portion (retention member 18 side end portion) of the webbing 16 and the spool becomes shorter, thereby increasing tensile force in the length direction of the webbing 16. Slack or the like in the webbing 16 is thereby eliminated in the webbing worn state, such that the body of the occupant 46 is firmly held by the webbing 16.

Moreover, in the event of a vehicle front-on collision, the respective gas supply devices of the pre-tensioners 66L, 66R are actuated. When gas is supplied into the cylinders 68L, 68R of the pre-tensioners 66L, 66R, the pistons in the cylinders 68L, 68R are moved toward the seat rear side by the pressure of the gas. The length direction both end portions of the elongated member 60 are thus moved toward the seat rear side together with the pistons.

When the length direction both end portions of the elongated member 60 are moved toward the seat rear side, as illustrated by the dotted lines in FIG. 2, the portion of the elongated member 60, which extends to the outside of the cylindrical member 52 and which is entrained around the right pulley 62R is moved to the seat upper side toward the right pulley 62R. Moreover, as illustrated by the dotted lines in FIG. 3, when the length direction both end portions of the elongated member 60 are moved toward the seat rear side, the portion of the elongated member 60, which extends to the outside of the cylindrical member 52 and which is entrained around the left pulley 62L is moved to the seat upper side toward the left pulley 62L. By moving the elongated member 60 toward the seat upper side on seat width direction both sides of the seat cushion 54 in this manner, the elongated member 60 is pulled toward the outer sides within the seat cushion 54, shortening the length of the elongated member 60, and the length direction center of the elongated member 60 is lifted toward the seat upper side inside the seat cushion 54 accompanying the cylindrical member 52.

Note that when the cylindrical member 52 is being lifted together with the elongated member 60, the cylindrical member 52 presses the cushion material inside the seat cushion 54 from the seat lower side so as to deform (elastically deform) the cushion material. Accordingly, the cylindrical member 52 receives resistance from the cushion material as the cylindrical member 52 attempts to rise. Thus, the speed with which the length direction central portion of the elongated member 60 moves toward the pulleys 62L, 62R from the outer sides of the cylindrical member 52 is slower than the movement speed of the length direction both end portions of the elongated member 60 toward the sear rear side due to actuation of the pre-tensioners 66L, 66R.

In this manner, since a difference arises between a movement amount of the two length direction both end portions of the elongated member 60 toward the sear rear side and a movement amount of the length direction central portion of the elongated member 60 toward the pulleys 62L, 62R, the pulleys 62L, 62R on the left and right are pulled toward the seat lower side by the length direction both end portions of the elongated member 60. The right pulley 62R is supported by the retention member 18, and is coupled to the anchor rod 22R through the retention member 18, the stay 40R, and the load absorbing member 36R. Accordingly, when the right pulley 62R is pulled toward the seat lower side by the elongated member 60, as illustrated by the dotted lines in FIG. 2, the right pulley 62R is pivoted toward the seat lower front side about the anchor portion 24R of the anchor rod 22R, accompanying the retention member 18. In this manner, the length direction leading end portion of the webbing 16 (the seat right side end portion of the lap webbing 16A) is pivoted toward the seat lower front side together with the retention member 18.

The left pulley 62L is supported by the buckle 44, and is coupled to the anchor rod 22L through the buckle 44, the stay 40L, and the load absorbing member 36L. Accordingly, when the left pulley 62L is pulled toward the seat lower side by the elongated member 60, as illustrated by the dotted lines in FIG. 3, the left pulley 62L is pivoted toward the seat lower front side about the anchor portion 24L of the anchor rod 22L, accompanying the buckle 44. The tongue 42 retained by the buckle 44 is pivoted toward the seat lower front side.

Since the webbing 16 is pulled by the tongue 42 in this manner when the tongue 42 pivots toward the seat lower front side, tensile force in the lap webbing 16A increases. Due to this increase in the tensile force in the lap webbing 16A, the shoulder webbing 16B of the webbing 16 attempts to move toward a lap webbing 16A side through the slit in the tongue 42. When the shoulder webbing 16B attempts to move toward the lap webbing 16A side (toward the retention member 18) through the slit in the tongue 42, the locking member provided at the tongue 42 moves.

When the locking member moves, the webbing 16 is pinched between the locking member and the opposing portion of the tongue 42 that opposes the locking member. The shoulder webbing 16B can thus be suppressed from moving toward the lap webbing 16A side through the slit, and the length direction length of the lap webbing 16A can be suppressed from increasing.

In this manner, the lap webbing 16A is moved to a location in the vicinity of a range from the thighs to the hips of the body of the occupant 46 by the pivoting of the length direction both end portions of the lap webbing 16A toward the seat lower front side while the length of the lap webbing 16A is suppressed from increasing. The location in the vicinity of the range from the thighs to the hips of the body of the occupant 46 is pressed toward the seat lower front side by the lap webbing 16A.

In this state, the retention member 18 is pulled toward the seat left side by the lap webbing 16A, and the buckle 44 is pulled toward the seat right side by the lap webbing 16A via the tongue 42. The force limiters 20L, 20R on both seat width direction sides are thus swung toward the seat width direction central side, substantially about the coupling portions between the anchor portions 24L, 24R of the anchor rods 22L, 22R and the attachment portions 32L, 32R on both seat width direction sides.

Moreover, when the pre-tensioners 66L, 66R are actuated as described above and the length direction both end portions of the elongated member 60 are moved, the loop 72 configured by the lap webbing 16A and the portion of the elongated member 60 between the left and right pulleys 62L, 62R is tightened toward a radial direction center of the loop 72, thus shortening the peripheral length of the loop 72. The length direction center of the elongated member 60 is lifted toward the seat upper side inside the seat cushion 54 accompanying the cylindrical member 52. The cushion material of the seat cushion 54 is thus pressed toward the seat upper side by the cylindrical member 52, such that the location in the vicinity of the range from the thighs to the hips of the occupant 46 is pressed toward the seat upper side by the cylindrical member 52 through the seat cushion 54.

Namely, the location in the vicinity of the range from the thighs to the hips of the occupant 46 is held by being gripped from seat vertical direction both sides by the loop 72 that has been tightened to a shorter peripheral length (see the state illustrated by double-dotted dashed lines in FIG. 1). Accordingly, in a vehicle front-on collision, the body of the occupant 46 can be suppressed from moving toward the seat front side under inertia, and in particular, in the event of a vehicle front-on collision in a state in which a seatback 82 is heavily reclined toward the seat rear side, the occurrence of what is referred to as the "submarining phenomenon", in which body of the occupant 46 passes between a seat upper face of the seat cushion 54 and the lap webbing 16A and moves toward the seat front side under inertia, can be suppressed.

In the present exemplary embodiment, on actuation of the pre-tensioners 66L, 66R on seat width direction both sides, the loop 72 is tightened, shortening the peripheral length of the loop 72. Namely, the lap webbing 16A and shoulder webbing 16B do not increase in length even if the length of the elongated member 60 between the pulleys 62L, 62R on the left and right is shortened. This enables a reduction in the restraint performance for the body of the occupant 46 by the webbing 16 to be suppressed in cases in which the length of the elongated member 60 between the pulleys 62L, 62R is shortened.

In the present exemplary embodiment, the elongated member 60 is entrained around the pulleys 62L, 62R on seat width direction both sides, and on actuation of the pre-tensioners 66L, 66R, the portion of the elongated member 60 between the pulleys 62L, 62R is lifted toward the pulleys 62L, 62R.

Since the elongated member 60 is entrained around the pulleys 62L, 62R, the pulleys 62L, 62R are rotated in the movement direction of the elongated member 60 as the elongated member 60 passes through the pulleys 62L, 62R. This enables the elongated member 60 to be moved smoothly, enabling the loop 72 to be tightened in a smooth manner.

Moreover, for example, depending on the physical build or posture of the occupant 46, the lap webbing 16A may be worn over the stomach of the occupant 46 in the webbing worn state. Note that in the present exemplary embodiment, as described above, actuation of the pre-tensioners 66L, 66R on seat width direction both sides moves the lap webbing 16A toward the seat lower front side. This enables the lap webbing 16A worn over the stomach of the occupant 46 to be moved into the range spanning from the thighs to the hips of the occupant 46. The stomach of the occupant 46 can thus be suppressed from being pressed by the lap webbing 16A in a vehicle front-on collision.

As described above, actuation of the pre-tensioners 66L, 66R moves the lap webbing 16A toward the seat lower front side, thereby pressing the location in the vicinity of the range from the thighs to the hips of the occupant 46 toward the seat front lower side. The pelvis of the occupant 46 is thus pressed toward the seat lower side by the lap webbing 16A, enabling the pelvis to be suppressed from tilting toward the seat rear side. Since the pelvis can be suppressed from tilting toward the seat rear side by being pressed by the lap webbing 16A in this manner, the upper body of the occupant 46 can be suppressed from tilting toward the seat rear side together with the pelvis, enabling the occurrence of the submarining phenomenon described above to be even more effectively suppressed.

In a vehicle front-on collision, the upper body of the occupant 46 attempts to pivot toward the seat front side such that the body of the occupant 46 folds forward. In the present exemplary embodiment, the location in the vicinity of the range from the thighs to the hips of the occupant 46 is held by the loop 72. The upper body of the occupant 46 can thus be made to pivot about the hips of the occupant 46. When the upper body of a person folds forward, folding forward about the hips is natural considering the structure of the human body. Accordingly, in the present exemplary embodiment, the upper body of the occupant 46 can be made to fold forward in a natural manner in a vehicle front-on collision.

In a vehicle front-on collision, the body of the occupant 46 attempts to move toward the seat front side under inertia, such that the webbing 16 is pulled by the body of the occupant 46. The tensile force imparted to the webbing 16 from the body of the occupant 46 acts so as to move the retention member 18 toward the seat front side at the right side of the seat 14. The tensile force transmitted to the retention member 18 further acts so as to move the load absorbing member 36R toward the seat upper end side of the rod portion 34R through the stay 40R of the right force limiter 20R.

The tensile force imparted to the webbing 16 from the body of the occupant 46 also acts so as to move the buckle 44 toward the seat front side through the tongue 42 at the left side of the seat 14. The tensile force transmitted to the buckle 44 further acts so as to move the load absorbing member 36L toward the seat upper end side of the rod portion 34L through the stay 40L of the left force limiter 20L.

Figure 4B:
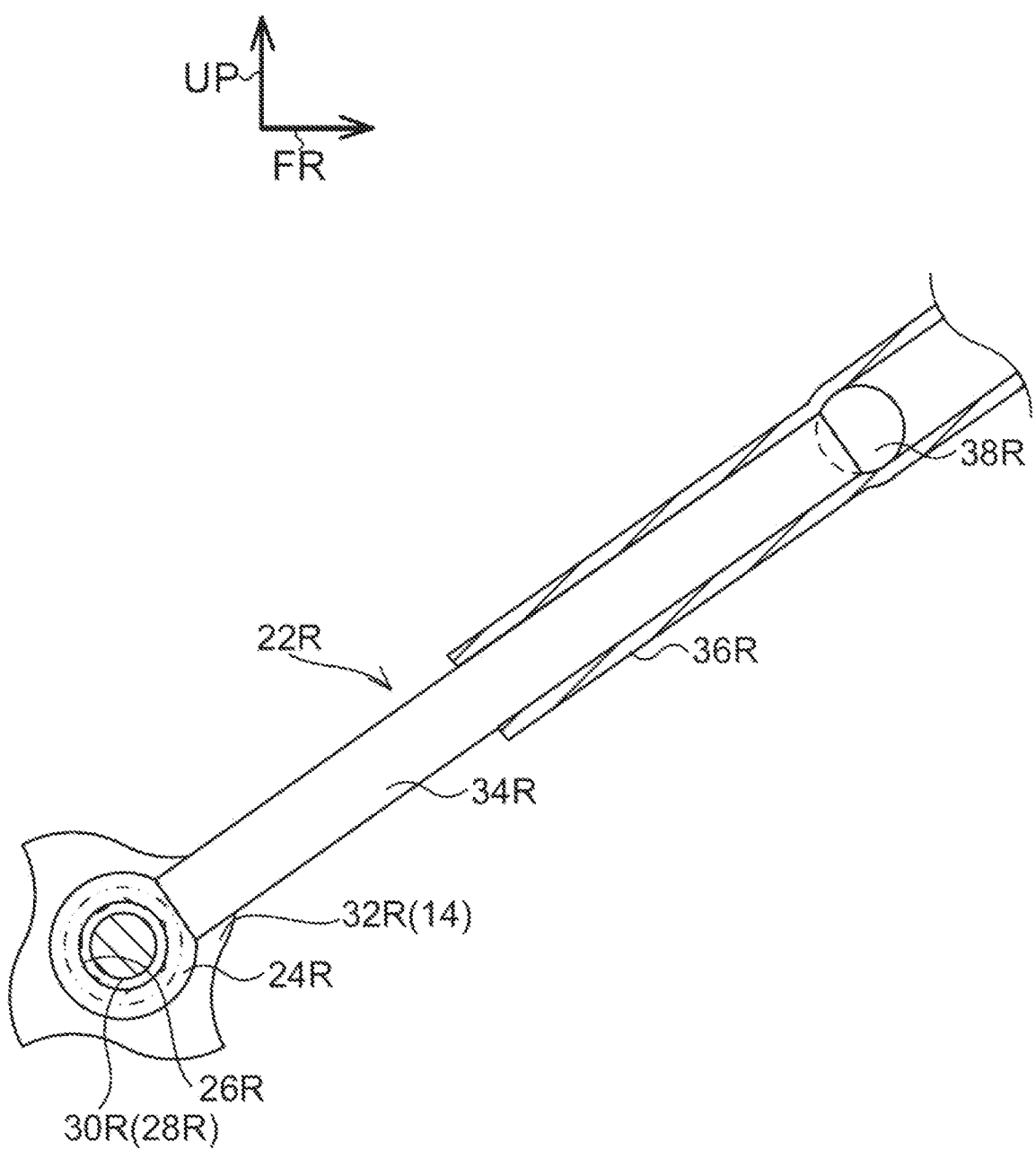
FIG. 4B illustrates an actuated state of the right force limiter in FIG. 4A.
Figure 5A:
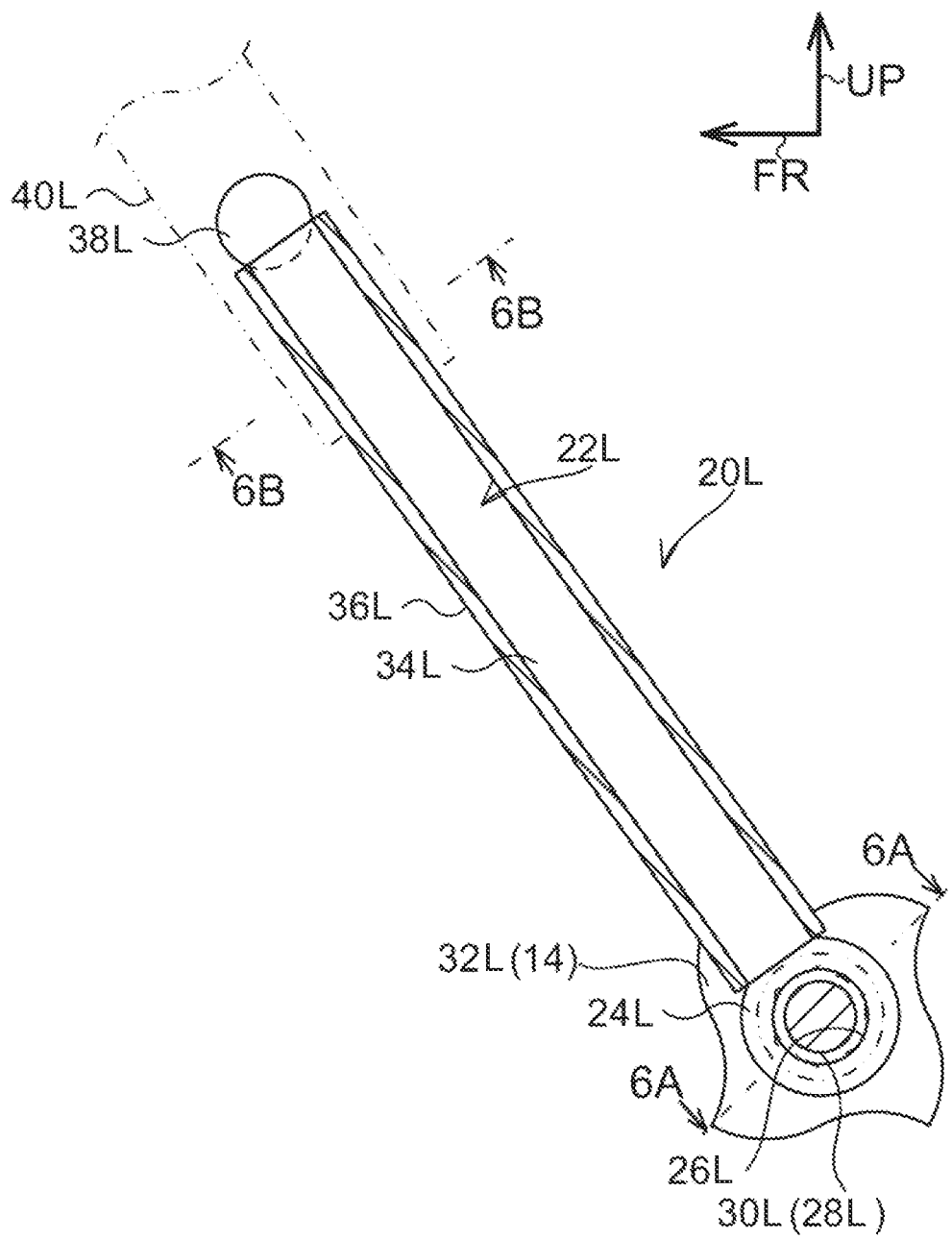
FIG. 5A is an enlarged side view illustrating a cross-section of part of a left force limiter as viewed from a seat left side in a state prior to actuation of the left force limiter.
Figure 5B:
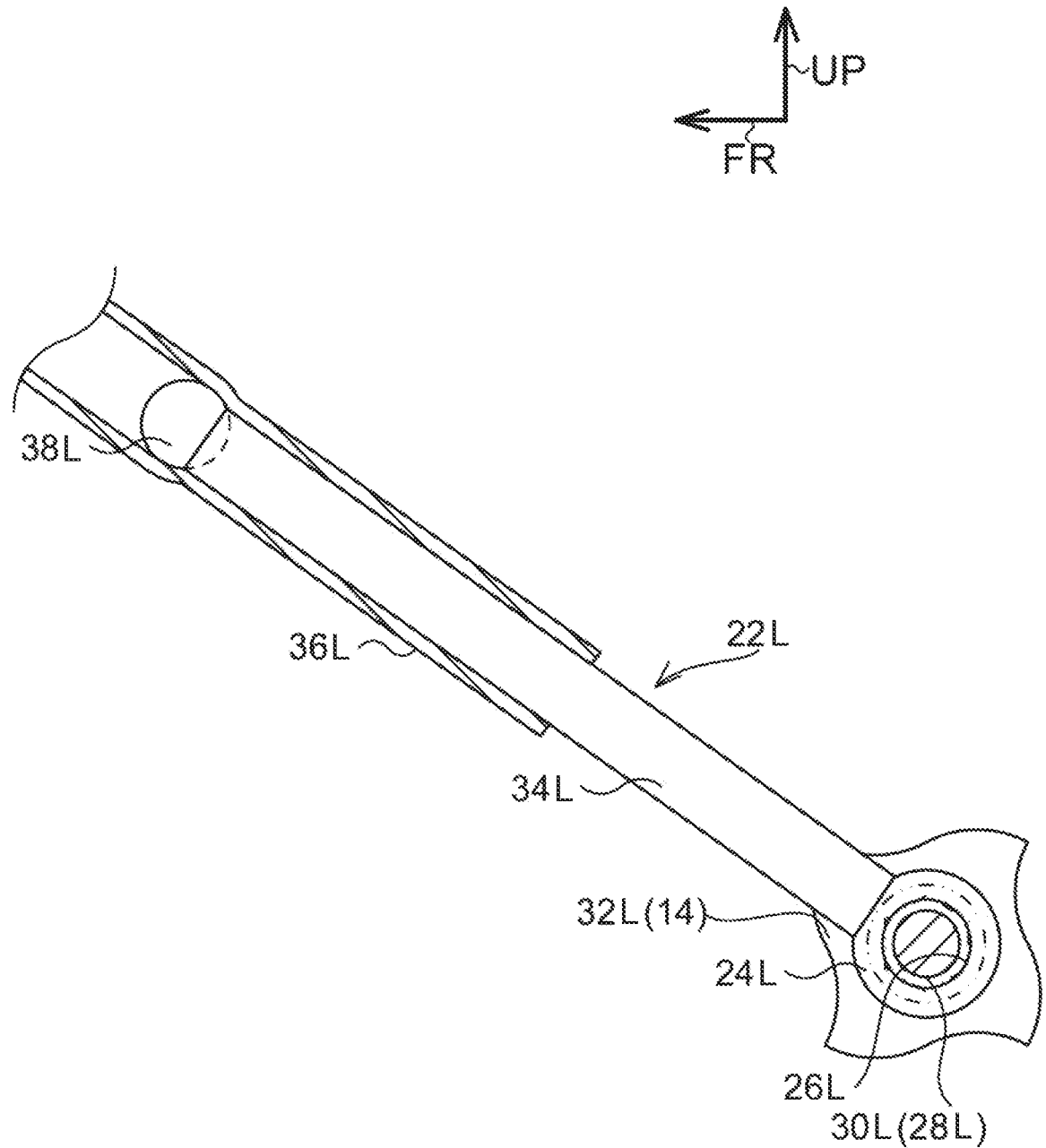
FIG. 5B illustrates an actuated state of the left force limiter in FIG. 5A.

Note that as illustrated in FIG. 5A, the load absorbing member 36L on the seat left side is restricted from moving toward the seat upper end side of the rod portion 34L by the ball portion 38L. However, if the reaction force received from the ball portion 38L by the load absorbing member 36L, which attempts to move toward the seat upper end side of the rod portion 34L, exceeds a first predetermined magnitude, as illustrated in FIG. 5B, the load absorbing member 36L is plastically deformed by the ball portion 38L so as to increase the internal diameter dimension of the load absorbing member 36L. As illustrated in FIG. 4A and FIG. 4B, the load absorbing member 36R on the seat right side is similarly plastically deformed by the ball portion 38R so as to increase the internal diameter dimension of the load absorbing member 36R if the reaction force received by the load absorbing member 36R from the ball portion 38R exceeds a second predetermined magnitude.

Accordingly, if the sum of the reaction forces received by the load absorbing members 36L, 36R from the respective ball portions 38L, 38R, as a result of tensile force received by the lap webbing 16A from the body of the occupant 46, exceeds the sum of the first predetermined magnitude and the second predetermined magnitude, the load absorbing members 36L, 36R move toward the seat upper end sides of the rod portions 34L, 34R while being deformed by the ball portions 38L, 38R. The buckle 44 and the retention member 18 are moved toward the seat front side by this movement of the load absorbing members 36L, 36R, such that the body of the occupant 46 moves toward the seat front side accompanying the lap webbing 16A.

Some of the tensile force imparted to the lap webbing 16A from the body of the occupant 46 is expended in the deformation of the load absorbing members 36L, 36R and absorbed. The body of the occupant 46 is able to move toward the seat front side by an amount commensurate to the movement amount of the load absorbing members 36L, 36R toward the seat upper end sides of the rod portions 34L, 34R. This enables reaction force received by the body of the occupant 46 from the lap webbing 16A to be lessened when the body of the occupant 46 attempts to move toward the seat front side under inertia and pulls the lap webbing 16A.

The force limiters 20L, 20R on seat width direction both sides are respectively configured by the stays 40L, 40R, the load absorbing members 36L, 36R, and the anchor rods 22L, 22R. The load absorbing members 36L, 36R and the anchor rods 22L, 22R are configured with circular cylinder shapes or rod shapes, and have short dimensions in the vehicle width direction. The force limiters 20L, 20R can thus be made compact in the seat width direction, which may be exploited during installation in narrow spaces at sides in the seat width direction of the seat 14.

In the present exemplary embodiment, the force limiters 20L, 20R respectively function as configurations to couple the retention member 18 and the buckle 44 to a left side and a right side attachment portion set on the seat frame, a vehicle reinforcing member, or the like. This enables an increase in the number of components to be suppressed.

In the present exemplary embodiment, the cylindrical member 52 is provided between the cushion materials of the seat cushion 54 that are separated in the seat vertical direction. Accordingly, when the occupant 46 is seated in the seat 14, the occupant 46 is unlikely to feel the presence of the cylindrical member 52 through their buttocks or thighs. Any detriment to the seating comfort of the seat 14 caused by providing the cylindrical member 52, the elongated member 60, and the like can thus be suppressed.

Moreover, in the present exemplary embodiment, the length direction one end portion of the elongated member 60 is moved toward the seat rear side on actuation of the right pre-tensioner 66R, and the length direction other end portion of the elongated member 60 is moved toward the seat rear side on actuation of the left pre-tensioner 66L. This enables the overall movement amount of the elongated member 60 at length direction both sides to be increased, even if the individual movement amount of the length direction one end portion of the elongated member 60 and the individual movement amount of the length direction other end portion of the elongated member 60 are small. This enables a reduction in the size of the pre-tensioners 66L, 66R on seat width direction both sides.

In the present exemplary embodiment, the portion of the elongated member 60 disposed inside the seat cushion 54 passes through the cylindrical member 52. However, configuration may be made in which the cylindrical member 52 is not provided.

The length direction one end portion of the elongated member 60 is anchored to the piston of the right pre-tensioner 66R, and the length direction other end portion of the elongated member 60 is anchored to the piston of the left pre-tensioner 66L. However, for example, configuration may be made in which the elongated member 60 is separated into a seat right side portion anchored to the piston of the right pre-tensioner 66R, and a seat left side portion anchored to the piston of the left pre-tensioner 66L, with the seat right side portion being coupled to a seat right side end portion of the cylindrical member 52, and the seat left side portion being coupled to a seat left side end portion of the cylindrical member 52.

Although the present exemplary embodiment is provided with both the right pre-tensioner 66R and the left pre-tensioner 66L, configuration may be made in which only one out of the right pre-tensioner 66R or the left pre-tensioner 66L is provided.

The length direction one end portion of the elongated member 60 is moved toward the seat rear side by actuation of the right pre-tensioner 66R, and the length direction other end portion of the elongated member 60 is moved toward the seat rear side by actuation of the left pre-tensioner 66L. However, for example, configuration may be made in which the length direction both end portions of the elongated member 60 are anchored to a single piston provided inside the cylinder of a single pre-tensioner, and the length direction both end portions of the elongated member 60 are moved by movement of the piston.

The load absorbing members 36L, 36R are deformed by reaction force received from the spherical shaped ball portions 38L, 38R provided at the seat upper ends of the rod portions 34L, 34R of the anchor rods 22L, 22R. As long as reaction force can be imparted to the load absorbing members 36L, 36R to deform the load absorbing members 36L, 36R, the specific form (shape) of the configuration by which reaction force is imparted to the load absorbing members 36L, 36R is not limited, and the rod portions 34L, 34R may, for example, each have a truncated circular conical shape with an external diameter dimension increasing on progression toward the seat upper end side.

Moreover, although the present exemplary embodiment is provided with the right force limiter 20R and the left force limiter 20L, configuration may be made in which only one out of the right force limiter 20R or the left force limiter 20L is provided.

In the left and right force limiters 20L, 20R of the present exemplary embodiment, the cylindrical load absorbing members 36L, 36R are deformed when the load absorbing members 36L, 36R move toward the seat upper end sides of the rod portions 34L, 34R. However, the specific form of the force limiters is not limited as long as a load absorbing member is deformed by part of a tensile force received by the webbing 16 from the occupant 46 so as to allow the body of the occupant 46 to move toward the seat front side under inertia accompanying the webbing 16 by an amount commensurate with the deformation of the load absorbing member, and a wide range of force limiters may be applied.

Although the tongue 42 includes the locking member in the present exemplary embodiment, a tongue 42 not including a locking member may also be applied.

In the present exemplary embodiment, the shoulder pre-tensioner of the retractor, the right pre-tensioner 66R, and the left pre-tensioner 66L are actuated in the event of a vehicle front-on collision. However, for example, configuration may be made in which the shoulder pre-tensioner, the right pre-tensioner 66R, and the left pre-tensioner 66L are actuated in a state in which a vehicle front-on collision would be difficult to avoid, namely when a front-on collision has been predicted. The timing for actuation of the shoulder pre-tensioner, the right pre-tensioner 66R, and the left pre-tensioner 66L need not be at the time at which a vehicle front-on collision occurs.

The right pulley 62R and the left pulley 62L both configure fold-back members. However, for example, a pin that projects from a seat width direction end portion of the seat 14 toward the seat width direction outer side and around which the elongated member 60 is entrained may be employed as a projecting member. Namely, as long as the fold-back member has a configuration capable of folding the elongated member 60 extending toward the seat upper side back toward the seat lower side at the width direction sides of the seat 14, the fold-back member need not be configured to rotate due to length direction movement of the elongated member 60.

What is claimed is:

1. A seatbelt device comprising:
   a webbing having an elongated belt shape with a length direction leading end portion of the webbing anchored to a retention member, at least a portion of the webbing configuring a lap webbing in a state in which the webbing is worn on a body of an occupant seated in a vehicle seat, and the lap webbing being configured to restrain a location in a vicinity of a waist of the occupant from a seat upper side;
   a tongue provided at a length direction intermediate portion of the webbing, the tongue being movable along the length direction of the webbing;
   a buckle provided at a seat width direction one side of the vehicle seat, the buckle being configured to retain the tongue such that, in a retained state of the tongue, a portion of the webbing that is further toward a length direction leading end side than the tongue configures the lap webbing;
   a lower restraint member including a length direction central portion running in the seat width direction inside a seat cushion of the vehicle seat, the lower restraint member, together with the lap webbing, forming a loop opening along a seat front-rear direction, at least a length direction one side of the lower restraint member being pulled and moved so as to tighten the loop and so as to shorten a peripheral length of the loop, and the lower restraint member being configured to press the body of the occupant from a seat lower side;
   a tensioning device configured to be actuated in a case of a front-on collision of the vehicle or in a case in which a front-on collision of the vehicle is predicted, the tensioning device being configured to pull at least the length direction one side of the lower restraint member on actuation to tighten the loop, and the tensioning device being configured to pull the lap webbing so as to move the lap webbing toward a seat lower front side; and
   a fold-back member provided at the seat width direction one side of the vehicle seat, wherein:
      the lower restraint member is led out from inside the seat cushion toward an outside, is extended toward a seat upper side at the seat width direction one side, is connected to the fold-back member, is folded back on itself toward the seat lower side, and is linked to the tensioning device.

2. The seatbelt device of claim 1, wherein the fold-back member is configured by a pulley around which the lower restraint member is entrained, and the pulley is rotated by movement of the lower restraint member toward at least the length direction one side of the lower restraint member.

3. The seatbelt device of claim 1, wherein tensioning devices are provided at both sides in the seat width direction of the vehicle seat, and the lower restraint member is pulled toward both sides in the length direction by actuation of the tensioning devices.

4. The seatbelt device of claim 1, further comprising a load absorbing member, wherein:
   the load absorbing member is coupled to at least the retention member or the buckle;
   the load absorbing member is coupled to an attachment portion disposed at a frame of the seat or at a vehicle body located further toward a seat lower rear side than the retention member or the buckle; and
   the load absorbing member is configured to permit movement of the retention member or the buckle toward a seat upper front side by undergoing deformation under a load to move the retention member or the buckle toward the seat upper front side, and is configured to absorb some of the load through the deformation thereof.

5. The seatbelt device of claim 4, wherein:
   the load absorbing member has a cylinder shape, includes a rod-shaped member disposed inside the load absorbing member, is provided with a load imparting portion at one end side coupled to the retention member or the buckle, and has an opening at the one end side, the opening having a shape smaller than the load imparting portion;
   an end portion in a length direction of the rod-shaped member is coupled to the attachment portion;
   the load imparting portion is larger than the rod-shaped member in a direction orthogonal to the length direction of the rod-shaped member, and is provided at another end portion in the length direction of the rod-shaped member; and
   the load absorbing member is configured to be moved toward the vehicle seat upper front side by the load to move the retention member or the buckle toward the seat upper front side.

6. The seatbelt device of claim 1, wherein the tongue is capable of restricting movement of the webbing further toward the length direction leading end side of the webbing than the tongue.

7. A seatbelt device comprising:
   a webbing having an elongated belt shape with a length direction leading end portion of the webbing anchored to a retention member, at least a portion of the webbing configuring a lap webbing in a state in which the webbing is worn on a body of an occupant seated in a vehicle seat, and the lap webbing being configured to restrain a location in a vicinity of a waist of the occupant from a seat upper side;
   a tongue provided at a length direction intermediate portion of the webbing, the tongue being movable along the length direction of the webbing;
   a buckle provided at a seat width direction one side of the vehicle seat, the buckle being configured to retain the tongue such that, in a retained state of the tongue, a portion of the webbing that is further toward a length direction leading end side than the tongue configures the lap webbing;
   a lower restraint member including a length direction central portion running in the seat width direction inside a seat cushion of the vehicle seat, the lower restraint member, together with the lap webbing, forming a loop opening along a seat front-rear direction, at least a length direction one side of the lower restraint member being pulled and moved so as to tighten the loop and so as to shorten a peripheral length of the loop, and the lower restraint member being configured to press the body of the occupant from a seat lower side; and tensioning devices provided at both sides in the seat width direction of the vehicle seat, and configured to be actuated in a case of a front-on collision of the vehicle or in a case in which a front-on collision of the vehicle is predicted, the tensioning devices being configured to pull at least the length direction one side of the lower restraint member on actuation to tighten the loop, and the tensioning devices being configured to pull the lap webbing so as to move the lap webbing toward a seat lower front side, wherein the lower restraint member is pulled toward both sides in the length direction by actuation of the tensioning devices.

8. The seatbelt device of claim 7, further comprising a fold-back member provided at the seat width direction one side of the vehicle seat, wherein:

the lower restraint member is led out from inside the seat cushion toward an outside, is extended toward a seat upper side at the seat width direction one side, is connected to the fold-back member, is folded back on itself toward the seat lower side, and is linked to the tensioning device; and the fold-back member is configured by a pulley around which the lower restraint member is entrained, and the pulley is rotated by movement of the lower restraint member toward at least the length direction one side of the lower restraint member.

9. The seatbelt device of claim 7, further comprising a load absorbing member, wherein:

the load absorbing member is coupled to at least the retention member or the buckle;

the load absorbing member is coupled to an attachment portion disposed at a frame of the seat or at a vehicle body located further toward a seat lower rear side than the retention member or the buckle; and the load absorbing member is configured to permit movement of the retention member or the buckle toward a seat upper front side by undergoing deformation under a load to move the retention member or the buckle toward the seat upper front side, and is configured to absorb some of the load through the deformation thereof.

10. The seatbelt device of claim 9, wherein:

the load absorbing member has a cylinder shape, includes a rod-shaped member disposed inside the load absorbing member, is provided with a load imparting portion at one end side coupled to the retention member or the buckle, and has an opening at the one end side, the opening having a shape smaller than the load imparting portion;

an end portion in a length direction of the rod-shaped member is coupled to the attachment portion;

the load imparting portion is larger than the rod-shaped member in a direction orthogonal to the length direction of the rod-shaped member, and is provided at another end portion in the length direction of the rod-shaped member; and the load absorbing member is configured to be moved toward the vehicle seat upper front side by the load to move the retention member or the buckle toward the seat upper front side.

11. The seatbelt device of claim 7, wherein the tongue is capable of restricting movement of the webbing further toward the length direction leading end side of the webbing than the tongue.

* * * * *